US012785149B2

(12) United States Patent
Han et al.

(10) Patent No.: US 12,785,149 B2
(45) Date of Patent: Nov. 3, 2026

(54) ELECTROLYTE FOR LITHIUM SECONDARY BATTERY, AND LITHIUM SECONDARY BATTERY COMPRISING SAME

(71) Applicant: LG ENERGY SOLUTION, LTD., Seoul (KR)

(72) Inventors: Suenghoon Han, Daejeon (KR); Seung Yoon Yang, Daejeon (KR); Seonghyo Park, Daejeon (KR); Changhun Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 777 days.

(21) Appl. No.: 17/770,193

(22) PCT Filed: May 11, 2021

(86) PCT No.: PCT/KR2021/005891
§ 371 (c)(1),
(2) Date: Apr. 19, 2022

(87) PCT Pub. No.: WO2021/235760
PCT Pub. Date: Nov. 25, 2021

(65) Prior Publication Data

US 2022/0393243 A1 Dec. 8, 2022

(30) Foreign Application Priority Data

May 18, 2020 (KR) ........................ 10-2020-0059383

(51) Int. Cl.
*H01M 10/0569* (2010.01)
*H01M 4/38* (2006.01)
(Continued)

(52) U.S. Cl.
CPC ..... *H01M 10/0569* (2013.01); *H01M 10/052* (2013.01); *H01M 10/054* (2013.01);
(Continued)

(58) Field of Classification Search
CPC ............. H01M 10/0569; H01M 50/46; H01M 10/052; H01M 10/054; H01M 10/0567;
(Continued)

(56) References Cited

U.S. PATENT DOCUMENTS

2002/0045102 A1 4/2002 Jung et al.
2003/0073005 A1 4/2003 Kim et al.
(Continued)

FOREIGN PATENT DOCUMENTS

CN 1336696 A 2/2002
CN 104051786 A 9/2014
(Continued)

OTHER PUBLICATIONS

Kai, Zhang Specification Machine Translation to English (Year: 2025).*
(Continued)

*Primary Examiner* — Barbara L Gilliam
*Assistant Examiner* — Lawrence La Raia, III
(74) *Attorney, Agent, or Firm* — Birch, Stewart, Kolasch & Birch, LLP

(57) ABSTRACT

An electrolyte solution for a lithium secondary battery including a first solvent containing a heterocyclic compound having at least one double bond and any one of an oxygen atom and a sulfur atom; a second solvent containing at least one of an ether-containing compound that does not contain fluorine, an ester-containing compound, an amide-containing compound, and a carbonate-containing compound; a
(Continued)

third solvent containing a hydrofluoro ether-containing compound; a lithium salt; lanthanum nitrate; and lithium nitrate.

8 Claims, 3 Drawing Sheets

(51) Int. Cl.

| | |
|---|---|
| ***H01M 10/052*** | (2010.01) |
| ***H01M 10/054*** | (2010.01) |
| ***H01M 10/0567*** | (2010.01) |
| ***H01M 10/0568*** | (2010.01) |
| ***H01M 50/46*** | (2021.01) |

(52) U.S. Cl.

CPC ... *H01M 10/0567* (2013.01); *H01M 10/0568* (2013.01); *H01M 50/46* (2021.01); *H01M 4/38* (2013.01); *H01M 2300/0034* (2013.01); *H01M 2300/004* (2013.01); *Y02E 60/10* (2013.01)

(58) Field of Classification Search

CPC ............... H01M 10/0568; H01M 4/38; H01M 2300/0034; H01M 2300/004; Y02E 60/10

See application file for complete search history.

(56) References Cited

U.S. PATENT DOCUMENTS

| | | | | |
|---|---|---|---|---|
| 2005/0175904 | A1 | 8/2005 | Gorkovenko | |
| 2006/0199080 | A1 | 9/2006 | Amine et al. | |
| 2007/0212615 | A1 | 9/2007 | Jost et al. | |
| 2010/0248023 | A1 | 9/2010 | Tsuruta et al. | |
| 2011/0250494 | A1 | 10/2011 | Nomura et al. | |
| 2014/0023935 | A1 | 1/2014 | Noguchi et al. | |
| 2014/0342242 | A1 | 11/2014 | Egorov et al. | |
| 2016/0322666 | A1 | 11/2016 | Kim et al. | |
| 2016/0336625 | A1 | 11/2016 | Jeong et al. | |
| 2017/0054180 | A1 | 2/2017 | Fukushima et al. | |
| 2018/0076485 | A1 | 3/2018 | Zhang et al. | |
| 2018/0175450 | A1 | 6/2018 | Chesneau et al. | |
| 2018/0254524 | A1* | 9/2018 | Zhang ............... | H01M 10/0568 |
| 2018/0294476 | A1 | 10/2018 | Zhamu et al. | |
| 2018/0301739 | A1 | 10/2018 | Park et al. | |
| 2019/0051940 | A1 | 2/2019 | Park et al. | |
| 2019/0245203 | A1* | 8/2019 | Cho .................. | H01M 10/0525 |
| 2020/0168907 | A1 | 5/2020 | Takijiri et al. | |
| 2020/0168950 | A1 | 5/2020 | Park et al. | |
| 2020/0235364 | A1 | 7/2020 | Kim et al. | |
| 2020/0266491 | A1 | 8/2020 | Hasegawa | |
| 2022/0238914 | A1* | 7/2022 | He ...................... | H01M 10/058 |
| 2022/0255129 | A1* | 8/2022 | Jang .................. | H01M 10/0568 |

FOREIGN PATENT DOCUMENTS

| | | | | | |
|---|---|---|---|---|---|
| CN | 107534184 | A | 1/2018 | | |
| CN | 107645016 | A | 1/2018 | | |
| CN | 108281859 | A | 7/2018 | | |
| CN | 109119573 | A | 1/2019 | | |
| CN | 109256582 | A | 1/2019 | | |
| CN | 110148787 | * | 8/2019 | | |
| CN | 110148787 | A | 8/2019 | | |
| EP | 3 282 514 | A1 | 2/2018 | | |
| JP | 8-339826 | A | 12/1996 | | |
| JP | 2001-35524 | A | 2/2001 | | |
| JP | 2002-75446 | A | 3/2002 | | |
| JP | 2008-532248 | A | 8/2008 | | |
| JP | 2010-232037 | | 10/2010 | | |
| JP | 2010-272503 | A | 12/2010 | | |
| JP | 2014-17250 | A | 1/2014 | | |
| JP | 2015-64991 | A | 4/2015 | | |
| JP | 2016-58384 | A | 4/2016 | | |
| JP | 2016-219411 | A | 12/2016 | | |
| JP | 2019-515463 | A | 6/2019 | | |
| JP | 2019-522316 | A | 8/2019 | | |
| KR | 10-2003-0031396 | A | 4/2003 | | |
| KR | 10-0578797 | B1 | 5/2006 | | |
| KR | 10-2006-0135958 | A | 12/2006 | | |
| KR | 10-2007-0027512 | A | 3/2007 | | |
| KR | 10-2008-0067964 | A | 7/2008 | | |
| KR | 10-1166275 | B1 | 7/2012 | | |
| KR | 10-2014-0136038 | A | 11/2014 | | |
| KR | 10-2015-0072239 | A | 6/2015 | | |
| KR | 10-2016-0128014 | A | 11/2016 | | |
| KR | 10-2017-0067648 | A | 6/2017 | | |
| KR | 10-2017-0082280 | A | 7/2017 | | |
| KR | 10-2017-0121047 | A | 11/2017 | | |
| KR | 10-2018-0114631 | A | 10/2018 | | |
| KR | 10-2019-0062228 | A | 6/2019 | | |
| KR | 10-1994879 | B1 | 7/2019 | | |
| KR | 10-2050836 | B1 | 12/2019 | | |
| WO | WO-2018084449 | A2 * | 5/2018 | ............. | C01B 17/00 |
| WO | WO 2019/026629 | A1 | 2/2019 | | |
| WO | WO 2019/054411 | A1 | 3/2019 | | |

OTHER PUBLICATIONS

Chao et al., "Solid-State Microelectrochemistry Electrical Characteristics of a Solid-State Microelectrochemical Transistor Based on Poly(3-methylthiophene)", Journal of the American Chemical Society, vol. 109, No. 7, 1987, pp. 2197-2199.

Fan et al., "Non-flammable electrolyte enables Li-metal batteries with aggressive cathode chemistries", Nature Nanotechnology, vol. 13, 2018, pp. 715-722.

Gordin et al., "Bis(2,2,2-trifluoroethyl) Ether as an Electrolyte Co-solvent for Mitigating Self-Discharge in Lithium-Sulfer Batteries", ACS Appl. Mater. Interfaces, vol. 6, 2014, pp. 8006-8010.

International Search Report (PCT/ISA/210) issued in PCT/KR2021/005691, dated Aug. 25, 2021.

Jin et al., "A novel strategy for high-stability lithium sulfur batteries by in situ formation of polysulfide adsorptive-blocking layer", Journal of Power Sources, vol. 355, 2017, pp. 147-153.

Kang et al., "A review of recent developments in rechargeable lithium-sulfer batteries", Nanoscale, vol. 8, 2016, pp. 16541-16588.

Liu et al., "Lanthanum Nitrate as Electrolyte Additive to Stabilize the Surface Morphology of Lithium Anode for Lithium-Sulfur Battery", ACS Appl. Mater. Interfaces, vol. 8, No. 12, pp. 7783-7789.

Wu et al., "Enhanced Cycling Stability of Sulfur Cathode Surface-Modified by Poly(N-methylpyrrole)", Electrochimica Acta, vol. 135, 2014, pp. 108-113.

Yang et al., "Pyrrole as a promising electrolyte additive to trap polysulfides for lithium-sulfur batteries", Journal of Power Sources, vol. 348, 2017, pp. 175-182.

Zhao et al. "Anode Interface Engineering and Architecture Design for High-Performance Lithium-Sulfur Batteries", Advanced Materials, vol. 31, No. 1806532, 2019, pp. 1-27.

Extended European Search Report for European Application No. 21808767.4, dated Oct. 5, 2023.

* cited by examiner

【Figure 1】
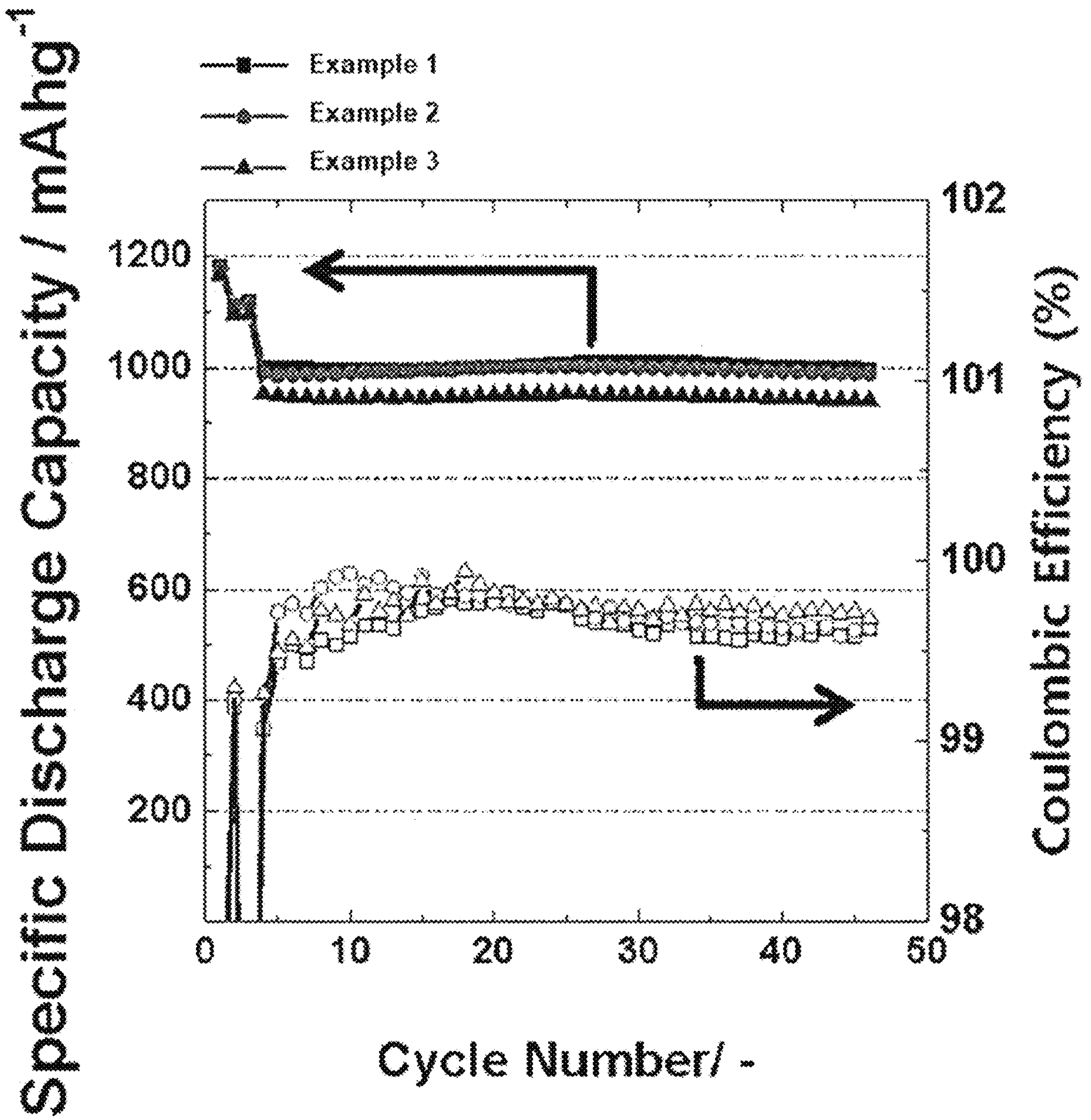

【Figure 2】
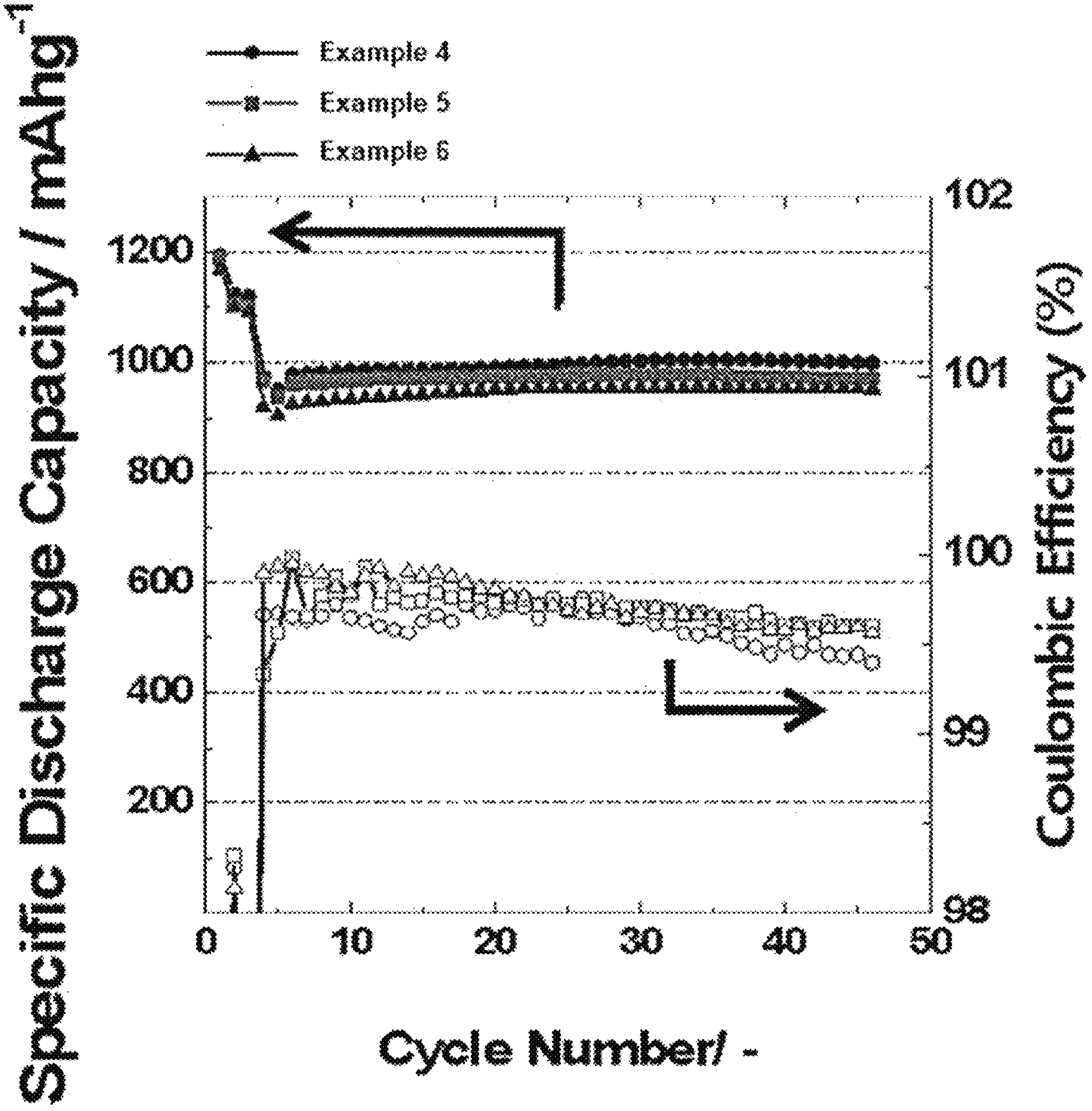

【Figure 3】
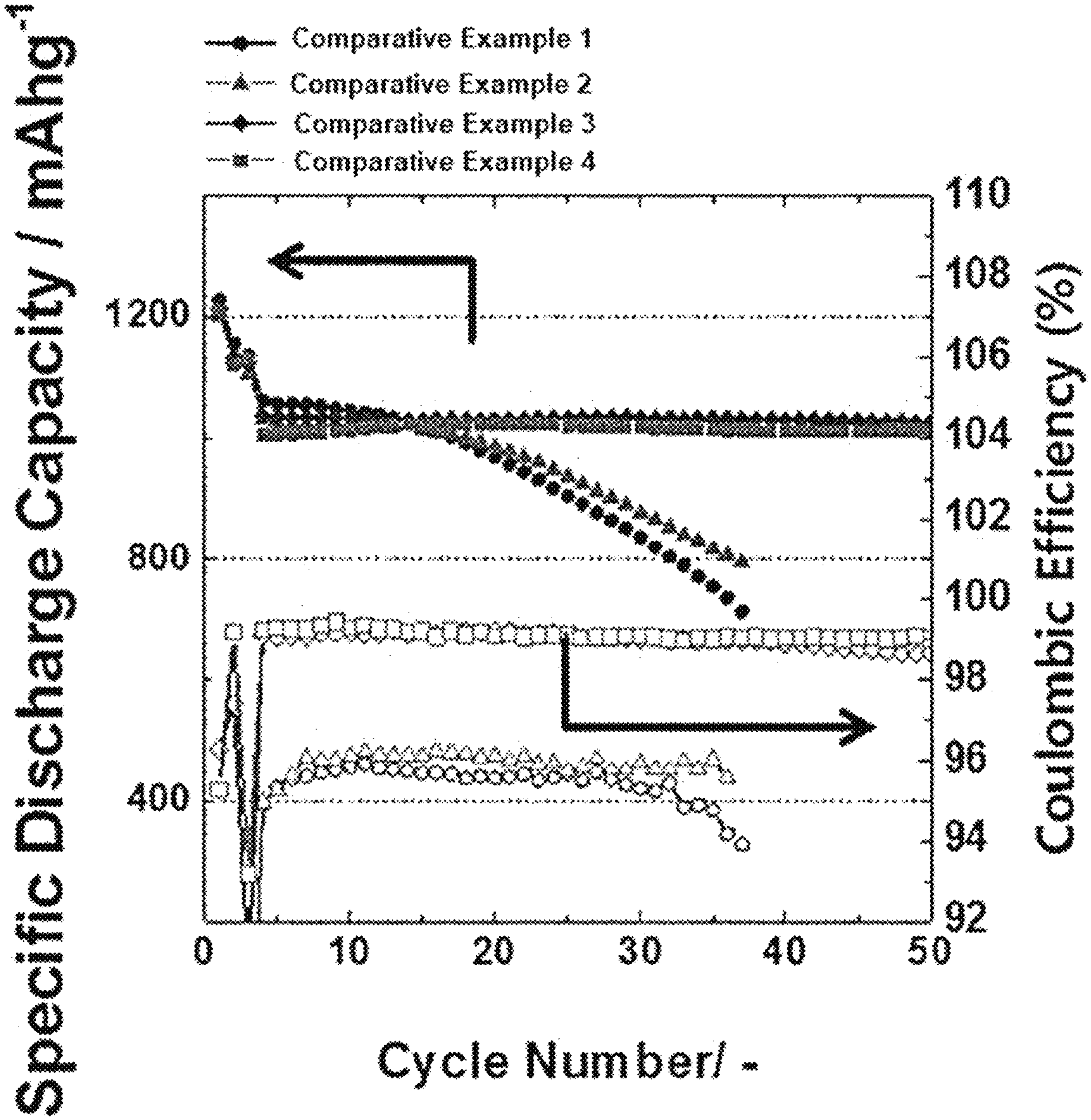

ELECTROLYTE FOR LITHIUM SECONDARY BATTERY, AND LITHIUM SECONDARY BATTERY COMPRISING SAME

TECHNICAL FIELD

The present application claims the benefit of priority based on Korean Patent Application No. 10-2020-0059383 filed on May 18, 2020, the entire contents of which are incorporated herein by reference.

The present invention relates to an electrolyte solution for a lithium secondary battery and a lithium secondary battery including the same, more particularly, to an electrolyte solution for a lithium secondary battery and a lithium secondary battery comprising the same, which can improve the performance of the battery by combining a highly reactive solvent and lithium salt which can increase the capacity of the battery, and a highly stable solvent and lithium salt which can increase the lifetime of the battery.

BACKGROUND ART

As interest in energy storage technology is increased, while its application is extended to the energy of mobile phones, tablets, laptops, and camcorders, and further to electric vehicles (EVs) and hybrid electric vehicles (HEVs), research and development of electrochemical devices are gradually increasing. Electrochemical devices are the field that is receiving the most attention in this respect, and among them, the development of secondary batteries such as a lithium-sulfur battery capable of charging and discharging has been a focus of interest. In recent years, in order to improve the capacity density and specific energy in developing such a battery, research and development on the design of new electrodes and batteries has been conducted.

Among such electrochemical devices, a lithium-sulfur battery (Li—S battery) has a high energy density (theoretical capacity) and thus is in the spotlight as a next-generation secondary battery that can replace the lithium ion-battery. In such a lithium-sulfur battery, the reduction reaction of sulfur and the oxidation reaction of lithium metal take place during discharging, and at this time, sulfur forms lithium polysulfide (LiPS) having a linear structure from $S_8$ having a cyclic structure. This lithium-sulfur battery is characterized by showing a stepwise discharging voltage until the polysulfide is completely reduced to $Li_2S$.

However, the biggest obstacle in the commercialization of the lithium-sulfur battery is lifetime, and during the charging/discharging process, the charging/discharging efficiency is reduced and the lifetime of the battery is deteriorated. The causes of such deterioration of the lifetime of the lithium-sulfur battery are various, such as the side reactions of the electrolyte solution (deposition of by-products due to the decomposition of the electrolyte solution), the instability of lithium metal (dendrite grows on the lithium negative electrode, causing a short circuit), and the deposition of positive electrode by-products (leaching of lithium polysulfide from the positive electrode).

That is, in a battery using a sulfur-based compound as a positive electrode active material and using an alkali metal such as lithium as a negative electrode active material, the leaching and shuttle phenomenon of lithium polysulfide occurs during charging/discharging, and the lithium polysulfide is transferred to the negative electrode, thereby reducing the capacity of the lithium-sulfur battery, and thus the lithium-sulfur battery has a major problem in that its lifetime is reduced and its reactivity is reduced. That is, since polysulfide leached from the positive electrode has high solubility in the organic electrolyte solution, it can undesirably move toward the negative electrode (PS shuttling) through the electrolyte solution. As a result, a decrease in capacity occurs due to irreversible loss of the positive electrode active material, and a decrease in the lifetime of the battery occurs due to deposition of sulfur particles on the surface of the lithium metal by side reactions.

Meanwhile, the behavior of such a lithium-sulfur battery can vary greatly depending on the electrolyte solution. The electrolyte solution when sulfur in the positive electrode is leached into the electrolyte solution in the form of lithium polysulfide (LiPS) is called Catholyte and the electrolyte solution when sulfur hardly leaches out in the form of lithium polysulfide is called sparingly soluble or solvating electrolyte (SSE). That is, in the art, various studies on a lithium-sulfur battery in which sulfur, a positive electrode active material, does not elute into the electrolyte solution (studies such as adding LiPS adsorption material to positive electrode composites or modifying separators made of existing PE, etc.) are being conducted, and in particular, studies on an electrolyte solution capable of proceeding a solid-to-solid reaction in which sulfur is converted to $Li_2S$, the final discharging product, are also being conducted, but it has not yet achieved such results. Accordingly, there is a need for a more fundamental method to suppress phenomenon that lithium polysulfide moves to the negative electrode and thus decreases the lifetime of the lithium-sulfur battery and that the reactivity decreases due to a large amount of lithium polysulfide.

Therefore, in the art, in effort of preventing the problem of side reactions of the electrolyte solution, attempts are being made to change the previously known electrolyte solution containing an ether-based solvent, etc. to an electrolyte solution containing also nitric acid-based compounds such as lanthanum nitrate ($La(NO_3)_3$), but a fundamental solution is still difficult.

That is, lanthanum nitrate has advantages such as improving the coulombic efficiency of a lithium-sulfur battery, and is therefore often used as an electrolyte solution for a lithium-sulfur battery. In this regard, ACS APPLIED MATERIALS & INTERFACES 2016, 8, P. 7783-7789, a non-patent document (paper), discloses a lithium-sulfur battery to which lanthanum nitrate ($La(NO_3)_3$) is applied as an electrolyte additive that stabilizes the surface, specifically discloses an electrolyte for a lithium-sulfur battery comprising even 1,3-dioxolane (DOL), dimethoxyethane (DME) and LiTFSI in addition to lanthanum nitrate, but does not still fundamentally improve the problem of deteriorating the lifetime of the lithium-sulfur battery.

Accordingly, there is a need to develop a new electrolyte solution for the lithium secondary battery, which can innovatively improve the lifetime performance of a lithium-sulfur battery while using lanthanum nitrate which is effective in improving the coulombic efficiency of the lithium-sulfur battery.

PRIOR ART DOCUMENT

Non-Patent Document (Paper 1) ACS APPLIED MATERIALS & INTERFACES 2016, 8, P. 7783-7789

DISCLOSURE

Technical Problem

Therefore, it is an object of the present invention to provide an electrolyte solution for a lithium secondary battery and a lithium secondary battery comprising the same, which can improve the performance of the battery by combining a highly reactive solvent and lithium salt which can increase the capacity of the battery, and a highly stable solvent and lithium salt which can increase the lifetime of the battery.

Technical Solution

In order to achieve the above object, the present invention provides an electrolyte solution for a lithium secondary battery, which comprises a first solvent comprising a heterocyclic compound having at least one double bond and any one of an oxygen atom and a sulfur atom; a second solvent comprising at least one of an ether-containing compound, which does not contain fluorine, an ester-containing compound, an amide-containing compound, and a carbonate-containing compound; a third solvent comprising a hydrofluoro ether-containing compound; a lithium salt; lanthanum nitrate; and lithium nitrate.

In addition, the present invention provides a lithium secondary battery comprising a positive electrode; a negative electrode; a separator interposed between the positive electrode and the negative electrode; and the electrolyte solution for the lithium secondary battery.

Advantageous Effects

According to the electrolyte solution for the lithium secondary battery and the lithium secondary battery comprising the same according to the present invention, the performance of the battery can be improved by combining a highly reactive solvent and lithium salt which can increase the capacity of the battery, and a highly stable solvent and lithium salt which can increase the lifetime of the battery, and a lithium salt. More specifically, it has an advantage of improving battery performance such as cycle lifetime by further comprising lanthanum nitrate and a hydrofluoro ether-based compound which has advantages such as improving the coulombic efficiency of the lithium-sulfur battery.

DESCRIPTION OF DRAWINGS

FIGS. 1 and 2 are graphs showing coulombic efficiency, discharging capacity, and lifetime performance of the lithium secondary battery manufactured according to an embodiment of the present invention.

FIG. 3 is a graph showing coulombic efficiency, discharging capacity, and lifetime performance of the lithium secondary battery manufactured according to a comparative example.

[Best Mode]

Hereinafter, the present invention will be described in detail.

The electrolyte solution for the lithium secondary battery according to the present invention comprises A) a first solvent comprising a heterocyclic compound containing one or more double bonds and at the same time, containing any one of an oxygen atom and a sulfur atom, B) a second solvent comprising at least one of an ether-based compound, which does not contain fluorine, an ester-based compound, an amide-based compound, and a carbonate-based compound, C) a third solvent comprising a hydrofluoro ether-based compound, D) lithium salt, E) lanthanum nitrate, and F) lithium nitrate.

As described above, at the present time when the development of the new electrolyte solution for the lithium secondary battery capable of dramatically improving the lifetime performance of the battery while using lanthanum nitrate, which is effective in improving the coulombic efficiency of the lithium-sulfur battery, is required, the applicant of the present invention has developed an electrolyte solution for a lithium secondary battery, which can enhance the capacity of the battery by combining a highly reactive solvent and lithium salt which can increase the capacity of the battery, and a highly stable solvent and lithium salt which can increase the lifetime of the battery, and more specifically which can enhance battery performance such as cycle lifetime by combining lanthanum nitrate and a hydrofluoro ether-based compound, which have advantages such as improving the coulombic efficiency of the lithium-sulfur battery, with a compound used as a component of an existing electrolyte solution.

That is, the electrolyte solution applicable to a lithium secondary battery such as a lithium-sulfur battery leads to a difference in performance such as lifetime or efficiency of the battery depending on the type of organic solvent and lithium salt (Li-Salt) contained in the electrolyte solution. Accordingly, after repeated studies to find a way to improve the performance of the battery by combining a highly reactive solvent and lithium salt which can increase the capacity of the battery, and a highly stable solvent and lithium salt which can increase the lifetime of the battery, the applicant of the present invention has derived the present invention with improved reactivity and lifetime by, i) incorporating 'a hydrofluoro ether-based (HFE type) compound,' which has advantages such as improving the coulombic efficiency of a lithium-sulfur battery, into the electrolyte solution (exactly, replacing a part of dimethoxyethane(DME) used as a component of the existing electrolyte solution), ii) likewise, incorporating 'lanthanum nitrate ($La(NO_3)_3$),' which has advantages such as improving the coulombic efficiency of a lithium-sulfur battery, into the electrolyte solution (exactly, replacing a part of $LiNO_3$ used as a component of the existing electrolyte solution), and at the same time, iii) replacing 1,3-dioxolane (DOL) used as a component of the existing electrolyte solution by 'a solvent comprising a heterocyclic compound containing one or more double bonds and any one of an oxygen atom and a sulfur atom (the first solvent)' and iv) also, likewise, replacing LiTFSI used as a component of the existing electrolyte solution by 'another lithium salt such as LiFSI'.

Hereinafter, each of A) the first solvent, B) the second solvent, C) the third solvent, D) lithium salt, E) lanthanum nitrate and F) lithium nitrate comprised in the electrolyte solution for the lithium secondary battery of the present invention will be described in detail.

A) First Solvent

The first solvent comprises a heterocyclic compound containing one or more double bonds and at the same time, containing any one of an oxygen atom and a sulfur atom, which has the property of being difficult to dissolve salts due to the delocalization of the lone pair electrons of the hetero atom (oxygen atom or sulfur atom), and thus can suppress the generation of lithium dendrites by forming a polymeric protective film (solid electrolyte interface, SEI layer) on the surface of a lithium-based metal (negative electrode) by a ring opening reaction of a heterocyclic compound in the initial discharging stage of the battery, and can further improve the lifetime characteristics of the lithium-sulfur battery by reducing the decomposition of the electrolyte solution on the surface of lithium-based metal and subsequent side reactions.

That is, the heterocyclic compound of the present invention must contain one or more double bonds in order to form a polymeric protective film on the surface of a lithium-based metal, and must also contain a hetero atom (oxygen atom or sulfur atom) to exhibit an effect such as increasing the affinity with other solvents in the electrolyte solution by making it polar.

The heterocyclic compound may be a 3 to 15 membered, preferably 3 to 7 membered, and more preferably 5 to 6 membered heterocyclic compounds. In addition, the heterocyclic compound may be a heterocyclic compound substituted or unsubstituted by at least one selected from the group consisting of an alkyl group having 1 to 4 carbon atoms, a cyclic alkyl group having 3 to 8 carbon atoms, an aryl group having 6 to 10 carbon atoms, a halogen group, a nitro group (—$NO_2$), an amine group (—$NH_2$), and a sulfonyl group (—$SO_2$). In addition, the heterocyclic compound may be a multicyclic compound of a heterocyclic compound and at least one of a cyclic alkyl group having 3 to 8 carbon atoms and an aryl group having 6 to 10 carbon atoms.

When the heterocyclic compound is substituted with an alkyl group having 1 to 4 carbon atoms, it is preferable because radicals can be stabilized and side reactions between electrolyte solutions can be suppressed. In addition, when substituted with a halogen group or a nitro group, it is preferable because a functional protective film can be formed on the surface of a lithium-based metal, and at this time, the formed functional protective film is a compacted protective film, and thus has an advantage of being stable, enabling uniform deposition of the lithium-based metal and suppressing side reactions between the polysulfide and the lithium-based metal.

Specific examples of the heterocyclic compound may be, but are not limited to, at least one selected from the group consisting of furan, 2-methylfuran, 3-methylfuran, 2-ethylfuran, 2-propylfuran, 2-butylfuran, 2,3-dimethylfuran, 2,4-dimethylfuran, 2,5-dimethylfuran, pyran, 2-methylpyran, 3-methylpyran, 4-methylpyran, benzofuran, 2-(2-nitrovinyl) furan, thiophene, 2-methylthiophene, 2-ethylthiophene, 2-propylthiophene, 2-butylthiophene, 2,3-dimethylthiophene, 2,4-dimethylthiophene, and 2,5-dimethylthiophene. Among them, it is preferable to use 2-methylfuran as the first solvent.

B) Second Solvent

The second solvent comprises at least one of an ether-based compounds, which does not contain fluorine, an ester-based compound, an amide-based compound, and a carbonate-based compound, and not only dissolves the lithium salt, so that the electrolyte solution has lithium-ion conductivity, but also elutes sulfur, which is a positive electrode active material, so that the electrochemical reaction with lithium can proceed smoothly. In the case of the carbonate-based compound, it may be a linear carbonate-based compound or a cyclic carbonate-based compound. Meanwhile, it is stated that in the second solvent, the compound that do not contain fluorine is limited to the ether-based compound, and the remaining ester-based compound, amide-based compound, and carbonate-based compound may contain fluorine.

Specific examples of the ether-based compound which does not contain fluorine may be, but is not limited to, at least one selected from the group consisting of dimethyl ether, diethyl ether, dipropyl ether, methylethyl ether, methylpropyl ether, ethylpropyl ether, dimethoxyethane, diethoxyethane, methoxyethoxyethane, diethylene glycol dimethylether, diethylene glycol diethylether, diethylene glycol methylethylether, triethylene glycol dimethylether, triethylene glycol diethylether, triethylene glycol methylethylether, tetraethylene glycol dimethylether, tetraethylene glycol diethylether, tetraethylene glycol methylethylether, polyethylene glycol dimethylether, polyethylene glycol diethylether and polyethylene glycol methylethylether. Among them, it is preferable to use dimethoxyethane as the second solvent.

In addition, the ester-based compound may be, but is not limited to, at least one selected from the group consisting of methyl acetate, ethyl acetate, propyl acetate, methyl propionate, ethyl propionate, propyl propionate, 7-butyrolactone, 7-valerolactone, 7-caprolactone, σ-valerolactone and ε-caprolactone. In addition, the amide-based compound may be a conventional amide-based compound used in the art.

In addition, the linear carbonate-based compound may be, but is not limited to, at least one selected from the group consisting of dimethyl carbonate (DMC), diethyl carbonate (DEC), dipropyl carbonate (DPC), ethylmethyl carbonate (EMC), methylpropyl carbonate (MPC), and ethylpropyl carbonate (EPC).

In addition, the cyclic carbonate-based compound may be, but is not limited to, at least one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinylethylene carbonate and halides thereof (fluoroethylene carbonate (FEC), etc.).

C) Third Solvent

The third solvent comprises a hydrofluoro ether-based (HFE type) compound, and has the effect of inhibiting the dissolution of polysulfide and the decomposition of the solvent, thereby improving the coulombic efficiency (C.E.) of the battery and thus ultimately improving the life of the battery Specific examples of the hydrofluoro ether-based compound may be at least one selected from the group consisting of bis(fluoromethyl)ether, 2-fluoromethylether, 1,1,2,2-tetrafluoroethyl2,2,3,3-tetrafluoropropylether, bis(2,2,2-trifluoroethyl)ether, propyl 1,1,2,2-tetrafluoroethylether, isopropyl 1,1,2,2-tetrafluoroethylether, 1,1,2,2-tetrafluoroethylisobutylether, 1,1,2,3,3,3-hexafluoropropylethylether, 1H,1H,2'H,3H-decafluorodipropylether and 1H,1H,2'H-perfluorodipropylether, and among them, it is preferable that bis(2,2,2-trifluoroethyl)ether (BTFE) is included as an essential component.

When reviewing the amounts of the first solvent, the second solvent and the third solvent as described above, the amount of the first solvent may be 5 vol. % to 50 vol. %, preferably 10_vol. % to 30 vol. %, the amount of the second solvent may be 45 vol. % to 90 vol. %, preferably 60_vol. % to 80 vol. %, and the amount of the third solvent may be 1 vol. % to 10 vol. %, preferably 5 vol % to 10 vol. %, based on the total amount of the first solvent, the second solvent and the third solvent.

Meanwhile, if the third solvent exceeds 10 vol. %, it may act as a factor to lower the discharging capacity of the battery due to an increase in resistance. Since the third solvent replaces a part of the second solvent, in particular, the mixing ratio of the second solvent and the third solvent may be Z: 1 to 79:1, preferably 7:1 to 15:1 as a volume ratio.

If the first solvent is contained in an amount of less than 5 vol. % relative to the total amount of the organic solvents, there may be a problem that the ability to reduce the leaching amount of polysulfide is lowered, so that the increase in resistance of the electrolyte solution cannot be suppressed or the protective film is not completely formed on the surface of the lithium-based metal. In addition, if the first solvent is contained in an amount exceeding 50 vol. % relative to the total amount of the organic solvents, there is a concern that problems such as a decrease in the discharging capacity of the battery may occur due to the increase in the surface resistance of the electrolyte solution and lithium-based metal.

In addition, if the second solvent is contained in an amount of less than 45 vol. % relative to the total amount of the organic solvents, there is a concern that a problem of lowering the lithium-ion conductivity may occur because the lithium salt cannot be sufficiently dissolved, and a problem in which sulfur is precipitated may occur because sulfur, an active material, exceeds the soluble concentration. If the second solvent exceeds 90 vol. %, sulfur, an active material, may be excessively leached, resulting in a severe shuttle phenomenon of lithium polysulfide and lithium negative electrode and a problem of shortening the lifetime.

In addition, if the third solvent is contained in an amount of less than 1 vol. % relative to the total amount of the organic solvents, there is a concern that the ability to inhibit the leaching of lithium polysulfide may become insufficient. If the third solvent exceeds 10 vol. % relative to the total amount of the organic solvents, there may be a problem that an overvoltage is largely generated by the resistance in mass transfer and the decrease in ionic conductivity due to the third solvent.

D) Lithium Salt

The lithium salt is an electrolyte salt used to increase ion conductivity, and may be used without limitation, as long as it is commonly used in the art. Specific examples of the lithium salt may be at least one selected from the group consisting of LiFSI, LiCl, LiBr, LiI, $LiClO_4$, $LiBF_4$, $LiB_{10}C_{10}$, $LiPF_6$, $LiCF_3SO_3$, $LiCF_3CO_2$, $LiC_4BO_8$, $LiAsF_6$, $LiSbF_6$, $LiAlCl_4$, $CH_3SO_3Li$, $(CF_3SO_2)_2NLi$, $(C_2F_5SO_2)_2NLi$, $(SO_2F)_2NLi$, $(CF_3SO_2)_3CLi$, lithium chloroborane, lithium lower aliphatic carboxylate having 4 or less carbon atoms, lithium 4-phenyl borate and lithium imide. Among them, it is preferable to use LiFSI ($(SO_2F)_2NLi$) as an essential component. In addition, in one embodiment of the present invention, the electrolyte solution may be in a form that does not contain LiTFSI ($(CF_3SO_2)_2NLi$).

The concentration of the lithium salt may be determined in consideration of ion conductivity and the like, and may be, for example, 0.1 to 2 M, preferably 0.5 to 1 M, and more preferably 0.5 to 0.75 M. the concentration of the lithium salt is less than the above range, it may be difficult to secure ion conductivity suitable for operating a battery. If the concentration of the lithium salt exceeds the above range, as the viscosity of the electrolyte solution is increased, the mobility of lithium ions is decreased, or the decomposition reaction of the lithium salt itself is increased, and thus the performance of the battery may be deteriorated.

E) Lanthanum Nitrate

The lanthanum nitrate ($La(NO_3)_3$) is a component used to improve the coulombic efficiency (C.E.) of the battery and ultimately improve the lifetime of the battery, and there is a case where the lanthanum nitrate ($La(NO_3)_3$) is used as a component of an electrolyte solution even before. However, this case contained 1,3-dioxolane (DOL), dimethoxyethane (DME), and LiTFSI in addition to lanthanum nitrate, so it did not fundamentally improve the problem of deteriorating the lifetime of the battery (that is, it is difficult to express the effect of lanthanum nitrate in an electrolyte solution mixed with DOL/DME/LiTFSI).

However, the present invention with improved reactivity, lifetime and the like is derived by replacing 1,3-dioxolane (DOL) used as a component of the existing electrolyte solution by 'a solvent comprising a heterocyclic compound containing one or more double bonds and at the same time containing any one of an oxygen atom and a sulfur atom (the first solvent)', while using lanthanum nitrate ($La(NO_3)_3$), also by replacing a part of the content occupied by dimethoxyethane (DME) with 'a hydrofluoro ether-based (HFE type) compound' and also by replacing LiTFSI used as a component of the existing electrolyte solution by 'another lithium salt such as LiFSI'.

The lanthanum nitrate as described above may be contained in an amount of 1 to 10% by weight, preferably 2 to 7% by weight, and more preferably 4 to 6% by weight, relative to the total weight of the electrolyte solution for the lithium secondary battery. If the lanthanum nitrate is contained in an amount of less than 1% by weight relative to the total weight of the electrolyte solution, there is a risk of problems that the degree of improvement of the coulombic efficiency of the battery becomes insignificant and thus the degree of improvement of the lifetime becomes also insignificant. If the lanthanum nitrate exceeds 10% by weight, any further advantage of the use of lanthanum nitrate may not appear.

F) Lithium Nitrate

In addition, the electrolyte solution for the lithium secondary battery according to the present invention basically contains lithium nitrate ($LiNO_3$). However, it may further contain, if needed, at least one selected from the group consisting of potassium nitrate ($KNO_3$), cesium nitrate ($CsNO_3$), magnesium nitrate ($MgNO_3$) ($Mg(NO_3)_2$), barium nitrate ($Ba(NO_3)_2$), lithium nitrite ($LiNO_2$), potassium nitrite ($KNO_2$) and cesium nitrite ($CsNO_2$).

Lithium nitrate may be contained in an amount of 0.5 to 10% by weight, preferably 1 to 6% by weight, more preferably 2 to 4% by weight, based on the total weight of the electrolyte solution for the lithium secondary battery. If the content of lithium nitrate is less than 0.5% by weight relative to the total weight of the electrolyte solution for the lithium secondary battery, the coulombic efficiency may be rapidly lowered. If the content of lithium nitrate exceeds 10% by weight, the viscosity of the electrolyte solution may be increased, thereby making it difficult to operate. Meanwhile, the total content of lithium nitrate and lanthanum nitrate is preferably about 2 to 10% by weight relative to the total weight of the electrolyte solution for the lithium secondary battery. In that case, the content ratio of lithium nitrate and lanthanum nitrate may be 1 to 5:5 to 1 as a weight ratio, but is not limited thereto.

Next, the lithium secondary battery according to the present invention will be described. The lithium secondary battery comprises a positive electrode, a negative electrode, a separator interposed between the positive electrode and the negative electrode, and the electrolyte solution for the lithium secondary battery. The electrolyte solution for the lithium secondary battery comprises A) the first solvent, B) the second solvent, C) the third solvent, D) lithium salt, E) lanthanum nitrate and F) lithium nitrate, as described above, and detailed descriptions of these are as described above. In addition, the lithium secondary battery may be any lithium secondary battery commonly used in the art, and among them, a lithium-sulfur battery may be most preferred.

Hereinafter, in the lithium secondary battery according to the present invention, the positive electrode, the negative electrode, and the separator will be described in more detail.

As described above, the positive electrode comprised in the lithium secondary battery of the present invention comprises a positive electrode active material, a binder, and an electrically conductive material. The positive electrode active material may be one that can be applied to a conventional lithium secondary battery, and for example may comprise elemental sulfur ($S_8$), a sulfur-based compound, or a mixture thereof. Specifically, the sulfur-based compound may be $Li_2S_n$($n \geq 1$), an organosulfur compound or a carbon-sulfur composite ($(C_2S_x)_n$: x=2.5~50, n≥2). In addition, the positive electrode active material may comprise a sulfur-carbon composite, and since the sulfur material alone does not have electrical conductivity, it may be used in combination with an electrically conductive material. The carbon material (or carbon source) constituting the sulfur-carbon composite may have a porous structure or a high specific surface area, and any carbon material may be used as long as it is commonly used in the art. For example, the porous carbon material may be, but is not limited to, at least one selected from the group consisting of graphite; graphene; carbon blacks such as DENKA black, acetylene black, KETJEN black, channel black, furnace black, lamp black, and thermal black; carbon nanotubes (CNTs) such as single wall carbon nanotube (SWCNT), and multiwall carbon nanotubes (MWCNT); carbon fibers such as graphite nanofiber (GNF), carbon nanofiber (CNF), and activated carbon fiber (ACF); and activated carbon, and its shape may be spherical, rod-shaped, needle-shaped, plate-shaped, tubular or bulk-shaped, and it can be used without limitation as long as it is commonly used in a lithium secondary battery.

In addition, pores are formed in the carbon material, and the porosity of the pores is 40 to 90%, preferably 60 to 80%. If the porosity of the pores is less than 40%, since lithium ions are not delivered normally, it can act as a resistance component and cause problems. If the porosity of the pores exceeds 90%, a problem of lowering the mechanical strength may occur. In addition, the pore size of the carbon material is 10 nm to 5 μm, preferably 50 nm to 5 μm. If the pore size is less than 10 nm, there may be a problem that lithium ions cannot be transmitted. If the pore size exceeds 5 μm, a short circuit of the battery due to contact between electrodes and safety problems may occur.

The binder is a component that assists in the bonding between a positive electrode active material and an electrically conductive material and the bonding to a current collector, and for example, may be, but is not limited to, at least one selected from the group consisting of polyvinylidene fluoride (PVdF), polyvinylidenefluoride-polyhexafluoropropylene copolymer (PVdF/HFP), polyvinyl acetate, polyvinyl alcohol, polyvinyl ether, polyethylene, polyethylene oxide, alkylated polyethylene oxide, polypropylene, polymethyl(meth)acrylate, polyethyl(meth)acrylate, polytetrafluoroethylene (PTFE), polyvinylchloride, polyacrylonitrile, polyvinylpyridine, polyvinylpyrrolidone, styrene-butadiene rubber, acrylonitrile-butadiene rubber, ethylene-propylene-diene monomer (EPDM) rubber, sulfonated EPDM rubber, styrene-butylene rubber, fluorine rubber, carboxymethylcellulose (CMC), starch, hydroxypropyl cellulose, regenerated cellulose, and mixtures thereof.

The binder is usually added in an amount of 1 to 50 parts by weight, preferably 3 to 15 parts by weight, based on 100 parts by weight of the total weight of the positive electrode. If the content of the binder is less than 1 part by weight, the adhesive strength between the positive electrode active material and the current collector may be insufficient. If the content of the binder is more than 50 parts by weight, the adhesive strength is improved but the content of the positive electrode active material may be reduced accordingly, thereby lowering the capacity of the battery.

The electrically conductive material comprised in the positive electrode is not particularly limited as long as it does not cause side reactions in the internal environment of the battery and has excellent electrical conductivity while not causing chemical changes in the battery. The electrically conductive material may typically be graphite or electrically conductive carbon, and may be, for example, but is not limited to, one selected from the group consisting of graphite such as natural graphite or artificial graphite; carbon black such as carbon black, acetylene black, KETJEN black, DENKA black, thermal black, channel black, furnace black, lamp black, and summer black; carbon-based materials whose crystal structure is graphene or graphite; electrically conductive fibers such as carbon fibers and metal fibers; carbon fluoride; metal powders such as aluminum and nickel powder; electrically conductive whiskers such as zinc oxide and potassium titanate; electrically conductive oxides such as titanium oxide; electrically conductive polymers such as polyphenylene derivatives; and a mixture of two or more thereof.

The electrically conductive material is typically added in an amount of 0.5 to 50 parts by weight, preferably 1 to 30 parts by weight based on 100 parts by weight of total weight of the positive electrode. If the content of electrically conductive material is too low, that is, if it is less than 0.5 parts by weight, it is difficult to obtain an effect on the improvement of the electrical conductivity, or the electrochemical characteristics of the battery may be deteriorated. If the content of the electrically conductive material exceeds 50 parts by weight, that is, if it is too much, the amount of positive electrode active material is relatively small and thus capacity and energy density may be lowered. The method of incorporating the electrically conductive material into the positive electrode is not particularly limited, and conventional methods known in the related art such as coating on the positive electrode active material can be used. Also, if necessary, the addition of the second coating layer with electrical conductivity to the positive electrode active material may replace the addition of the electrically conductive material as described above.

In addition, a filler may be selectively added to the positive electrode of the present invention as a component for inhibiting the expansion of the positive electrode. Such a filler is not particularly limited as long as it can inhibit the expansion of the electrode without causing chemical changes in the battery, and examples thereof may comprise olefinic polymers such as polyethylene and polypropylene; fibrous materials such as glass fibers and carbon fibers.

The positive electrode active material, the binder, the electrically conductive material and the like are dispersed and mixed in a dispersion medium (solvent) to form a slurry, and the slurry can be applied onto the positive electrode current collector, followed by drying and rolling it to prepare a positive electrode. The dispersion medium may be, but is not limited to, N-methyl-2-pyrrolidone (NMP), dimethyl formamide (DMF), dimethyl sulfoxide (DMSO), ethanol, isopropanol, water, or a mixture thereof.

The positive electrode current collector may be, but is not limited to, platinum (Pt), gold (Au), palladium (Pd), iridium (Ir), silver (Ag), ruthenium (Ru), nickel (Ni), stainless steel (STS), aluminum (Al), molybdenum (Mo), chromium (Cr), carbon (C), titanium (Ti), tungsten (W), ITO (In doped $SnO_2$), FTO (F doped $SnO_2$), or an alloy thereof, or aluminum (Al) or stainless steel whose surface is treated with carbon (C), nickel (Ni), titanium (Ti) or silver (Ag) or so on. The shape of the positive electrode current collector may be in the form of a foil, film, sheet, punched form, porous body, foam or the like.

The negative electrode is a lithium-based metal, and may further include a current collector on one side of the lithium-based metal. the current collector may be a negative electrode current collector. The negative electrode current collector is not particularly limited as long as it has high electrical conductivity without causing chemical changes in the battery, and may be selected from the group consisting of copper, aluminum, stainless steel, zinc, titanium, silver, palladium, nickel, iron, chromium, and alloys and combinations thereof. The stainless steel can be surface-treated with carbon, nickel, titanium, or silver, and the alloy may be an aluminum-cadmium alloy. In addition, sintered carbon, a non-conductive polymer surface-treated with an electrically conductive material or a conductive polymer may be used. In general, a thin copper foil is used as the negative electrode current collector.

In addition, the shape of the negative electrode current collector can be various forms such as a film having or not having fine irregularities on a surface, sheet, foil, net, porous body, foam, nonwoven fabric and the like. In addition, the negative electrode current collector is in the thickness range of 3 to 500 μm. If the thickness of the negative electrode current collector is less than 3 μm, the current collecting effect is lowered. On the other hand, if the thickness exceeds 500 μm, when folding and then assembling the cell, there is a problem that the workability is reduced.

The lithium-based metal may be lithium or a lithium alloy. In that case, the lithium alloy contains an element capable of alloying with lithium, and specifically the lithium alloy may be an alloy of lithium and at least one selected from the group consisting of Si, Sn, C, Pt, Ir, Ni, Cu, Ti, Na, K, Rb, Cs, Fr, Be, Mg, Ca, Sr, Sb, Pb, In, Zn, Ba, Ra, Ge and Al.

The lithium-based metal may be in the form of a sheet or foil, and in some cases, may be in a form in which lithium or a lithium alloy is deposited or coated on a current collector by a dry process, or may be in a form in which metal and an alloy in a particle phase are deposited or coated by a wet process or the like.

A conventional separator may be interposed between the positive electrode and the negative electrode. The separator is a physical separator having a function of physically separating the electrodes, and can be used without particular limitation as long as it is used as a conventional separator, and particularly, a separator with low resistance to ion migration in the electrolyte solution and excellent impregnating ability for the electrolyte solution is preferable.

In addition, the separator enables the transport of lithium ions between the positive electrode and the negative electrode while separating or insulating the positive electrode and the negative electrode from each other. The separator may be made of a porous, nonconductive, or insulating material. The separator may be an independent member such as a film or a coating layer added to the positive electrode and/or the negative electrode.

Examples of the polyolefin-based porous film which can be used as the separator may be films formed of any polymer alone selected from polyethylenes such as high density polyethylene, linear low density polyethylene, low density polyethylene, and ultra-high molecular weight polyethylene, and polyolefin-based polymers such as polypropylene, polybutylene, and polypentene, or formed of a polymer mixture thereof. Examples of the nonwoven fabric that can be used as the separator is a nonwoven fabric formed by a polymer of polyphenyleneoxide, polyimide, polyamide, polycarbonate, polyethyleneterephthalate, polyethylenenaphthalate, polybutyleneterephthalate, polyphenylenesulfide, polyacetal, polyethersulfone, polyetheretherketone, polyester and the like alone or a mixture thereof. Such nonwoven fabrics include a nonwoven fabric in the form of a fiber to form a porous web, that is, a spunbond or a meltblown nonwoven fabric composed of long fibers.

The thickness of the separator is not particularly limited, but is preferably in the range of 1 to 100 μm, more preferably 5 to 50 μm. If the thickness of the separator is less than 1 μm, the mechanical properties cannot be maintained. If the thickness of the separator exceeds 100 μm, the separator acts as a resistive layer, thereby deteriorating the performance of the battery. The pore size and porosity of the separator are not particularly limited, but it is preferable that the pore size is 0.1 to 50 μm and the porosity is 10 to 95%. If the separator has a pore size of less than 0.1 μm or a porosity of less than 10%, the separator acts as a resistive layer. If the separator has a pore size of more than 50 μm or a porosity of more than 95%, mechanical properties cannot be maintained.

The lithium secondary battery of the present invention comprising the positive electrode, the negative electrode, separator, and the electrolyte solution as described above may be manufactured through a process of making the positive electrode face the negative electrode, and interposing a separator therebetween and then injecting the electrolyte solution for the lithium secondary battery according to the present invention.

Meanwhile, the lithium secondary battery according to the present invention can be not only applicable to a battery cell used as a power source of a small device, but also can be particularly suitably usable as a unit battery of a battery module which is a power source of a medium and large-sized device. In this respect, the present invention also provides a battery module in which at least two lithium secondary batteries are electrically connected (in series or in parallel). It is needless to say that the number of lithium secondary batteries comprised in the battery module may be variously adjusted in consideration of the use and capacity of the battery module. In addition, the present invention provides a battery pack in which the battery modules are electrically connected according to a conventional technique in the art. The battery module and the battery pack may be used as a power source for at least one medium and large-sized device selected from power tools; electric cars comprising an electric vehicle (EV), a hybrid electric vehicle (HEV), and a plug-in hybrid electric vehicle (PHEV); electric trucks; electric commercial vehicles; or power storage systems, but the present invention is not limited thereto.

Hereinafter, preferred examples are provided to help understanding of the present invention, but the following examples are only for exemplifying the present invention, and it is apparent to those skilled in the art that various changes and modifications can be made within the scope and spirit of the present invention, and such changes and modifications are within the scope of the appended claims.

[Example 1] Manufacture of Lithium Secondary Battery

Preparation of Electrolyte Solution

First, LiFSI was dissolved in the organic solvent, which was obtained by mixing 2-methylfuran (the first solvent), dimethoxyethane (the second solvent), and bis(2,2,2-trifluoroethyl) ether (BTFE, the third solvent) in a volume ratio (v/v) of 20:79:1, to a concentration of 0.75 M, and then 3% by weight of lithium nitrate ($LiNO_3$) and 5% by weight of lanthanum nitrate ($La(NO_3)_3$) based on the total weight of the electrolyte solution were added to prepare an electrolyte solution for a lithium secondary battery. At this time, lanthanum nitrate ($La(NO_3)_3$) was prepared by vacuum drying $La(NO_3)_3 \cdot 6H_2O$ from Aldrich company at 180 °C for 18 hours to remove $H_2O$.

Manufacture of Positive Electrode

90 Parts by weight of sulfur-carbon (CNT) composite (S/C 70:30 weight ratio) as a positive electrode active material, 5 parts by weight of DENKA Black as an electrically conductive material, 5 parts by weight of styrene-butadiene rubber/carboxymethyl cellulose (SBR/CMC 7:3) as a binder were mixed to prepare a slurry composition for the positive electrode, and then the prepared slurry composition was coated on a current collector (Al Foil), dried at 50 °C for 12 hours, and pressed with a roll press device to prepare a positive electrode (at this time, the loading amount was 3.5 $mAh/cm^2$, and the porosity of the electrode was 65%).

Manufacture of Lithium Secondary Battery (Lithium-Sulfur Battery)

The prepared positive electrode and the lithium metal negative electrode having a thickness of 150 μm were positioned to face each other, a polyethylene (PE) separator was interposed therebetween, and the prepared electrolyte solution was injected to manufacture a coin cell type lithium-sulfur battery. Meanwhile, in the manufacture of the battery, the positive electrode was punched out and used as a 14 phi circular electrode, polyethylene separator was punched out and used as a 19 phi separator, lithium metal was punched out and used as a 16 phi negative electrode,

[Example 2-6, Comparative Example 1-4] Manufacture of Lithium Secondary Battery

Lithium secondary batteries of Examples 2 to 6 and Comparative Examples 1 to 4 were prepared in the same manner as in Example 1, except that the composition of the electrolyte solution was changed as shown in Table 1 below.

TABLE 1

| | Electrolyte solution | | | | | |
|---|---|---|---|---|---|---|
| | First solvent | Second solvent | Third solvent | Lithium salt | Lanthanum nitrate | Lithium nitrate |
| Example 1 | 2-methylfuran 20 vol. % | dimethoxyethane 79 vol. % | BTFE 1 vol. % | LiFSI 0.75M | $La(NO_3)_3$ 5 wt. % | $LiNO_3$ 3 wt. % |
| Example 2 | 2-methylfuran 20 vol. % | dimethoxyethane 75 vol. % | BTFE 5 vol. % | LiFSI 0.75M | $La(NO_3)_3$ 5 wt. % | $LiNO_3$ 3 wt. % |
| Example 3 | 2-methylfuran 20 vol. % | dimethoxyethane 70 vol. % | BTFE 10 vol. % | LiFSI 0.75M | $La(NO_3)_3$ 5 wt. % | $LiNO_3$ 3 wt. % |
| Example 4 | 2-methylfuran 20 vol. % | dimethoxyethane 79 vol. % | BTFE 1 vol. % | LiFSI 0.5M | $La(NO_3)_3$ 5 wt. % | $LiNO_3$ 3 wt. % |
| Example 5 | 2-methylfuran 20 vol. % | dimethoxyethane 75 vol. % | BTFE 5 vol. % | LiFSI 0.5M | $La(NO_3)_3$ 5 wt. % | $LiNO_3$ 3 wt. % |
| Example 6 | 2-methylfuran 20 vol. % | dimethoxyethane 70 vol. % | BTFE 10 vol. % | LFSI 0.5M | $La(NO_3)_3$ 5 wt. % | $LiNO_3$ 3 wt. % |
| Comparative Example 1 | 1,3-dioxolane 50 vol. % | dimethoxyethane 50 vol. % | — | LiFSI 0.75M | — | $LiNO_3$ 3 wt. % |
| Comparative Example 2 | 1,3-dioxolane 50 vol. % | dimethoxyethane 50 vol. % | — | LiFSI 0.75M | $La(NO_3)_3$ 5 wt. % | $LiNO_3$ 3 wt. % |
| Comparative Example 3 | 2-methylfuran 20 vol. % | dimethoxyethane 80 vol. % | — | LiFSI 0.75M | — | $LiNO_3$ 3 wt. % |
| Comparative Example 4 | 2-methylfuran 20 vol. % | dimethoxyethane 80 vol. % | — | LiFSI 0.75M | $La(NO_3)_3$ 5 wt. % | $LiNO_3$ 3 wt. % |

[Experimental Example 1] Evaluation of Coulombic Efficiency of Lithium Second Battery The lithium secondary batteries (precisely, lithium-sulfur batteries) prepared in Examples 1 to 6 are charged and discharged at 0.1 C for 3 cycles, then continuously, charged at 0.2 C, and discharged at 0.3 C to evaluate the coulombic efficiency of the batteries. At that time, the range of the voltage used was set to 1.8~2.5 V (i.e., the discharging was set up to 1.8 V, and the charging was set up to 2.5 V), and the evaluation temperature was set to 25 °C.

FIGS. 1 and 2 are graphs showing coulombic efficiency, discharging capacity, and lifetime performance of the lithium secondary battery manufactured according to an embodiment of the present invention. All of the lithium-sulfur batteries of Examples 1 to 6, in which a part of the content of dimethoxyethane in the electrolyte solution is replaced by BTFE, and also, lanthanum nitrate ($La(NO_3)_3$) and LiFSI are applied together, had excellent coulombic efficiency as shown in FIGS. 1 and 2 (All exceeded 99%, indicating excellent enough to approach 100%). In general, as the content of BTFE increased, the coulombic efficiency tended to increase as well. Through this, it was confirmed that as the content of BTFE increases, the coulombic efficiency that affects the lifetime performance of the lithium-sulfur battery increases.

[Experimental Example 2] Evaluation of Lifetime Characteristics and Discharging Capacity of Lithium Secondary Battery The lithium secondary batteries (exactly, lithium-sulfur batteries) prepared in Comparative Examples 1 to 4 were charged and discharged at 0.1 C for 3 cycles, charged at 0.2 C, and discharged at 0.3 C to evaluate the lifetime characteristics and discharging capacity of the batteries. At that time, the range of the voltage used was set to 1.8~2.5 V (i.e., the discharging was set up to 1.8 V, and the charging was set up to 2.5 V), and the evaluation temperature was set to 25 °C.

FIG. 3 is a graph showing coulombic efficiency, discharging capacity, and lifetime performance of the lithium secondary battery manufactured according to a comparative example. As shown in FIGS. 1 to 3, the lithium-sulfur battery of Example 1, in which a part of the dimethoxyethane content in the electrolyte solution is replaced by BTFE, and also, lanthanum nitrate ($La(NO_3)_3$) and LiFSI are applied together, showed superior coulombic efficiency even while maintaining the similar discharging capacity as compared to the lithium-sulfur batteries of Comparative Examples 1 to 4 that did not contain BTFE in the electrolyte solution (the lifetime characteristics are even excellent as compared to Comparative Examples 1 and 2). Through this, it was found that BTFE is used, the coulombic efficiency is increased and the lifetime performance of the lithium-sulfur battery is improved.

Next, when reviewing the lifetime characteristics and discharging capacity between Examples 1 to 6 with reference to FIGS. 1 and 2, it can be seen that in all of Examples 1 to 6, coulombic efficiency and lifetime performance are improved as the content of BTFE is increased. However, it was confirmed that in the case of Example 3 using BTFE at 10 vol. %, among Examples 1 to 3 using LiFSI at 0.75M, the discharging capacity was slightly lower than those of Examples 1 and 2, but in the case of Example 6 using LiFSI at 0.5M and BTFE at 10 vol. %, the discharging capacity was higher as compared to Example 3. Therefore, it can be seen that it is preferable to use the LiFSI contained in the electrolyte solution of the present invention at a concentration as close to 0.5M as possible.

In summary, the electrolyte solution of the present invention may improve coulombic efficiency and lifetime performance of a battery by replacing a part of the second solvent such as dimethoxyethane with the third solvent such as BTFE and may improve them as the content of the third solvent is increased. However, there is a concern that as the content of the third solvent increases, the resistance also increases and thus the discharging capacity decreases, it is required, in particular, to set the concentration of the lithium salt (LiFSI) and the content of the third solvent within the scope of the present invention.

The invention claimed is:

1. An electrolyte solution for a lithium secondary battery, comprising:

a first solvent comprising a heterocyclic compound having at least one double bond and any one of an oxygen atom and a sulfur atom;

a second solvent comprising at least one of an ether-containing compound that does not contain fluorine;

a third solvent comprising bis(2,2,2-trifluoroethyl) ether;

lithium nitrate;

LiFSI; and lanthanum nitrate;

wherein an amount of the first solvent is 10 vol. % to 30 vol. %, an amount of the second solvent is 70 vol. % to 79 vol. %, and an amount of the third solvent is 5 vol. % to 10 vol. %, based on a total amount of the first solvent, the second solvent and the third solvent, wherein a mixing ratio of the second solvent and the third solvent is 7:1 to 15:1 as a volume ratio, wherein a concentration of the LiFSI is 0.5 M to 0.75 M, wherein the electrolyte solution does not include 1,3-dioxolane (DOL), wherein the electrolyte solution does not include LiTFSI, wherein the heterocyclic compound is 2-methylfuran, and wherein the ether-containing compound that does not contain fluorine is dimethoxyethane.

2. The electrolyte solution for the lithium secondary battery according to claim 1, wherein the third solvent further comprises at least one selected from the group consisting of bis(fluoromethyl) ether, 2-fluoromethylether, 1,1,2,2-tetrafluoroethyl2,2,3,3-tetrafluoropropylether, propyl 1,1,2,2-tetrafluoroethylether, isopropyl 1,1,2,2-tetrafluoroethylether, 1,1,2,2-tetrafluoroethylisobutylether, 1,1,2,3,3,3-hexafluoropropylethylether, 1H,1H,2'H,3H-decafluorodipropylether and 1H, 1H,2'H-perfluorodipropylether.

3. The electrolyte solution for the lithium secondary battery according to claim 1, further comprising at least one of: LiCl, LiBr, LiI, $LiClO_4$, $LiBF_4$, $LiB_{10}Cl_{10}$, $LiPF_6$, $LiCF_3SO_3$, $LiCF_3CO_2$, $LiC_4BO_8$, $LiAsF_6$, $LiSbF_6$, $LiAlCl_4$, $CH_3SO_3Li$, LiTFSI ($(CF_3SO_2)_2NLi$), $(C_2F_5SO_2)_2NLi$, $(CF_3SO_2)_3CLi$, lithium chloroborane, lithium lower aliphatic carboxylate having 4 or less carbon atoms, lithium 4-phenyl borate and lithium imide.

4. The electrolyte solution for the lithium secondary battery according to claim 1, wherein the electrolyte solution for the lithium secondary battery further comprises at least one selected from the group consisting of potassium nitrate, cesium nitrate, magnesium nitrate, barium nitrate, lithium nitrite, potassium nitrite and cesium nitrite.

5. The electrolyte solution for the lithium secondary battery according to claim 1, wherein a total amount of the lithium nitrate and lanthanum nitrate is 2% to 10% by weight based on a total weight of the electrolyte solution for the lithium secondary battery.

6. The electrolyte solution for the lithium secondary battery according to claim 1, wherein the electrolyte solution is for a lithium-sulfur battery.

7. A lithium secondary battery, comprising:

a positive electrode;

a negative electrode;

a separator interposed between the positive electrode and the negative electrode; and the electrolyte solution for the lithium secondary battery of claim 1.

8. The lithium secondary battery according to claim 7, wherein the lithium secondary battery is a lithium-sulfur battery.

* * * * *